Patented June 5, 1934

1,961,960

UNITED STATES PATENT OFFICE 1,961,960

METHOD OF PRODUCING CONCENTRATED MILK CONSTITUENTS

Forest H. Clickner, Chicago, Ill., assignor to Kraft-Phenix Cheese Corporation, Chicago, Ill., a corporation of Delaware No Drawing. Application October 6, 1933, Serial No. 692,425

6 Claims. (Cl. 99—11)

My invention relates to the isolation of milk constituents and has to do more particularly with a method for producing a concentrated natural casein product similar to that disclosed in Ambrose application, Serial No. 660,464, filed March 13, 1933.

While milk has heretofore been separated into its various solid constituents, so far as I know, prior to the inventions of Ambrose and myself, casein in substantially its natural physical and chemical condition has not been isolated in nearly pure form, either in the form of a fluid sludge wherein the casein, though diluted with water, is present in a concentration several times that in which it occurs in normal milk, or in dry condition.

I have discovered that casein in the condition described above can be conveniently and economically prepared by treating milk with the enzymes present in *Aspergillus oryzæ*.

My preferred procedure is as follows:

*Aspergillus oryzæ* which has been propagated on a high-protein culture medium, such as wheat bran or the like, is preferably extracted with distilled water at a temperature of about 98° F., to obtain the enzymes in solution free from insoluble matter. The preferred extract is that obtained from 10 pounds of powdered *Aspergillus oryzæ* with 100 pounds of water.

To 1,000 pounds of ordinary sweet milk, preferably of a pH value between about 6 and 7 raw or pasteurized and preferably skimmed, I add about 12 ounces of the enzyme extract obtained as described and the material is allowed to stand at about 98° F. for about 30 minutes. The enzymic action causes the casein particles suspended in the milk to agglomerate, appearing as an extremely fine flocculent precipitate. The milk is then preferably brought to a pasteurizing temperature, say, about 145° F., to destroy the enzyme, although this step may be omitted if the material is quickly converted to a powder, as described below. If the enzymic action were unduly extended, peptic action would set in and the casein solubilized, which is not desired.

The material after pasteurization is drained or filtered, yielding a sludge which can be used in that form or can be dried at low temperatures by various means, as on rollers or by means of spraying. By "low temperatures" I mean below, say, 165° F., above which the condition of the casein would be materially changed.

The casein obtained as a result of my process is found to have substantially the same chemical characteristics as the casein found in normal fresh milk but is of a somewhat larger particle size; however, a valuable property of my improved product, whether in sludge or in dry form, is that it will become readily dispersed when water is added thereto to reassume the condition in which it is present in natural milk. The product of my invention is substantially pure casein except that it is, of course, contaminated with slight quantities of the other milk solids, such as lactose, lactalbumin and mineral salts.

It is recognized that proteolytic enzymes have heretofore been used to precipitate casein from milk, particularly rennet. Other enzymes of the general class of *Aspergillus oryzæ* also will precipitate casein, but yield toxic products or produce a curd similar to the action of rennet. However, in no case prior to my discovery, so far as I know, has casein been separated from milk by enzymic action without a substantial change in its chemical or physical condition or the production of toxins. As is well known, the casein produced by rennet is a heavy, cheesy product which is quite incapable of redispersion in water, in contradistinction to the casein precipitated by the *Aspergillus oryzæ* enzymes, as described above.

The material produced in accordance with my invention is chemically and physically stable, is free from any objectionable flavor or odor, and may be used as a stabilizer for various materials. It is particularly useful as an ingredient of an ice-cream mix, wherein it may be substituted for a substantial proportion of the milk solids including fat, as well as for a part or all of the usual stabilizer, and is found to produce a greatly improved ice-cream of superior smoothness, as described in Ambrose application Serial No. 668,815, filed May 1, 1933.

The sludge referred to above may contain varying proportions of water, depending upon how thoroughly it is drained or filtered. In any event, the casein would be present in a concentration a plurality of times that in which it occurs in normal milk.

Various modifications in the process described above and uses mentioned may suggest themselves to those skilled in the art without departing from the spirit of my invention. Hence, I do not wish to be limited to the specific disclosure herein except as set forth in the appended claims, which are to be interpreted as broadly as the state of the art will permit.

I claim as my invention:

1. A method of producing a concentrated casein in substantially its natural chemical condition, comprising treating milk having a pH value within the approximate range of 6-7 with the enzymes of *Aspergillus oryzae* until the casein is precipitated, and then removing the supernatant liquor.

2. A method of producing a concentrated casein in substantially its natural chemical condition, comprising adding an extract of *Aspergillus oryzae* to milk having a pH value within the approximate range of 6-7, said milk containing suspended casein in substantially its normal condition, allowing the material to stand at about 98° F. for a sufficient length of time for the casein to be precipitated and form a sludge, and then removing the supernatant liquor.

3. A method of producing a concentrated casein in substantially its natural chemical condition, comprising adding an extract of *Aspergillus oryzae* to milk having a pH value within the approximate range of 6-7, said milk containing casein in substantially its normal concentration and condition, allowing the material to stand at about 98° F. for a sufficient length of time for the casein to be precipitated in flocculent form, removing a substantial quantity of water to separate the sludge, and then drying the sludge.

4. A method of producing a milk product comprising adding to a natural milk having a pH value between about 6 and 7, enzymes of *Aspergillus oryzae*, allowing the material to stand for a sufficient length of time to precipitate the casein in flocculent form, destroying the enzyme, and then removing the excess liquor, the last two steps being accomplished without substantially modifying the casein.

5. A method as defined in claim 1, wherein the *Aspergillus oryzae* has been cultured in a medium consisting largely of wheat bran.

6. A method as defined in claim 1, wherein the *Aspergillus oryzae* has been cultured in a high-protein vegetable medium.

FOREST H. CLICKNER.